United States Patent [19]
Evers, deceased et al.

[11] 3,828,810
[45] Aug. 13, 1974

[54] TEMPERATURE RESISTANT SEAL AND VALVE ASSEMBLY

[75] Inventors: James D. Evers, deceased, late of Corry, Pa.; Louisa E. Bender; Donald A. Bender, executors, both of North Haven, Conn.

[73] Assignee: Midland-Ross Corporation, Cleveland, Ohio

[22] Filed: Sept. 25, 1972

[21] Appl. No.: 291,983

[52] U.S. Cl............................. 137/494, 351/334
[51] Int. Cl............................................ F16k 1/42
[58] Field of Search ............. 251/333, 334; 137/494

[56] References Cited
UNITED STATES PATENTS
484,843    10/1892    Bavier........................... 251/333 X
1,246,879  11/1917    Chadwick......................... 251/333

*Primary Examiner*—Henry T. Klinksiek
*Assistant Examiner*—Robert J. Miller

[57] ABSTRACT

Structure providing a seal, e.g., in pressure relief valves typically to be provided in the servo-modulating or shutoff type, wherein a sealing ring of C-shaped cross section is supported on one of two relatively movable members of the valve housing for continuous contact by the other member when engaged thereby. The sealing ring of C-shaped cross section is particularly useful where the seal is subjected to repetitive opening and closing cycles accompanied by the movement of fluid at elevated temperatures between the seal ring and the valve lip portion of the member which moves into and out of contact with the ring.

14 Claims, 8 Drawing Figures

TEMPERATURE RESISTANT SEAL AND VALVE ASSEMBLY

BACKGROUND OF THE INVENTION

The present invention is concerned, for example, with the problem of providing suitable valving apparatus for the bleeding of hot gases from the engines of jet aircraft for de-icing engine cowlings and the like. Because of the temperatures, e.g., 1,200° F. of the gases to be handled, valve seals must be resistant to warping and corrosion to avoid valve leakage which in turn causes loss of engine power and accelerated warpage and corrosion of the bleed-off parts.

Sealing rings of arcuate, V-shaped, or C-shaped cross section extending in the thickness or width-wise direction of the ring of various materials hereinafter generically referred to as "C rings," are known essentially for use in static seals, i.e., a seal wherein parts of a fluid-tight joint have no relative movement when once assembled. As typically used in a static seal, a C ring comprising a resilient material has its sides confined and supported between radially-spaced, radially-facing annular surfaces, or axially-spaced, axially-facing flanges.

Some objects of the invention are:

1. to provide a temperature resistant seal for valves of the sliding type in which a principal portion of the seal is easily replaceable;
2. to provide a seal component or element of concavo-convex cross section which maintains its serviceability under extremes of heating and cooling and has excellent abrasion and corrosion resistance;
3. to provide a sliding type valve seal capable of operating without warping or eroding under temperatures such as encountered in handling exhaust gases of jet aircraft engines and to provide generally leakproof service when used thereon; and
4. to provide a seal component of such resiliency that its surface finish is not especially critical in effecting a satisfactory seal with a mating surface moving into and out of contact therewith.

SUMMARY OF THE INVENTION

The term "valve assembly" as used herein is intended to include any mechanical construction in which parts form a seal as herein described and separate from a sealed position to allow passage of a fluid between the parts.

The present invention resides in a valve assembly which comprises a circular C ring, or non-circular continuously circuit element of similar cross section, in thin gauge sheet construction, a supporting member or structure providing a continuous shallow groove or recess within which the ring is received, and a second member which is movable relative to the grooved member to continuously engage the outer convex surface of the C ring when moving in a direction in transverse relation to the general plane of the ring tending to cause the second member to pass transversely over the ring. The first member defines a preferably substantially square cut shallow groove in which the width of the ring preferably spans the full width of the groove and its depth is such as to cause the outer convex surface of the ring to be exposed outwardly of the groove and thusly accessible for engagement with the second member when sealed relationship of the members is established. In a preferred embodiment, the ring supporting member comprises a sleeve or flange for sandwiching a portion of the ring between it and the bottom of the groove to promote the effectiveness of the seal by forcing the ring against the bottom of the groove.

It is understood that either member may be movable while the other is stationary or also movable in effecting engagement and the indicated sealed relationship. The term "C ring" as used in connection with this invention refers to any resilient element of circuit but not necessarily circular configuration and has uniform cross section as measured in a plane perpendicular to the general plane of the element. Such cross section bulges outwardly in a direction parallel to the general plane of the element to provide a resilient outer convex or bulging surface facing either into or away from the region encompassed by the element whereby such surface is in oblique angular alignment with the path of the member which is separable from the element but constructed and supported as to be movable toward the element to engage it continuously along its entire circuit to form a seal.

BRIEF DESCRIPTION OF THE DRAWING

In the drawing with respect to which the invention is described.

DESCRIPTION OF PREFERRED EMBODIMENTS

Figure 1:
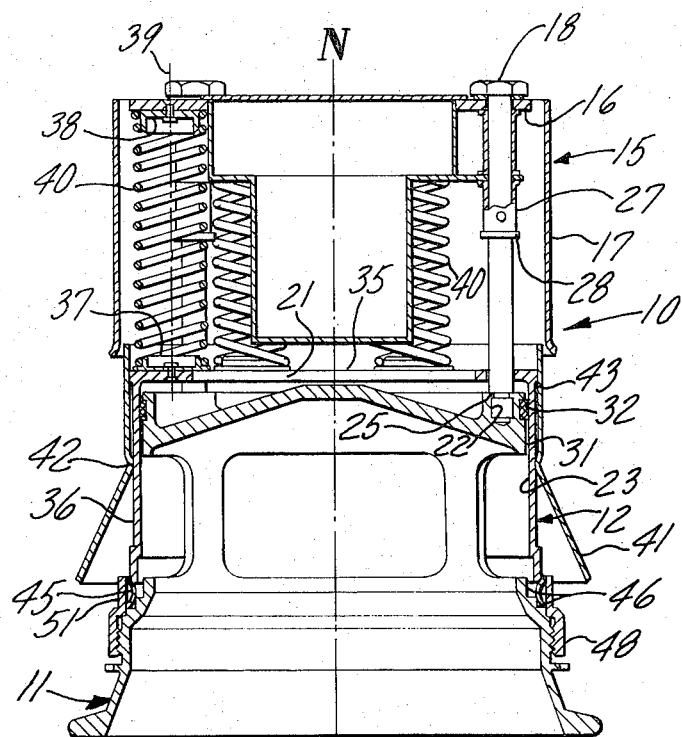
FIGS. 1 and 2 are fragmentary views partially in diametral cross section illustrating a slide-type valve in closed condition in FIG. 1 and in open condition in FIG. 2.
Figure 2:
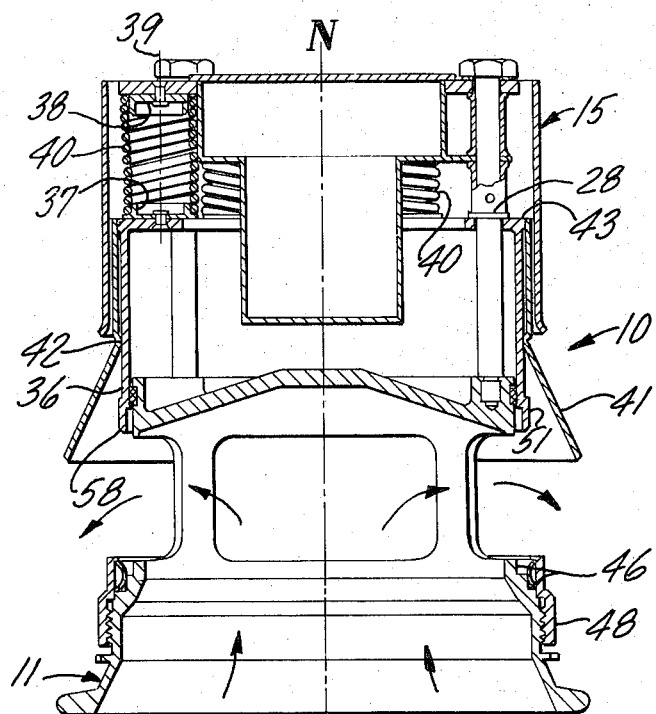
Figure 3:
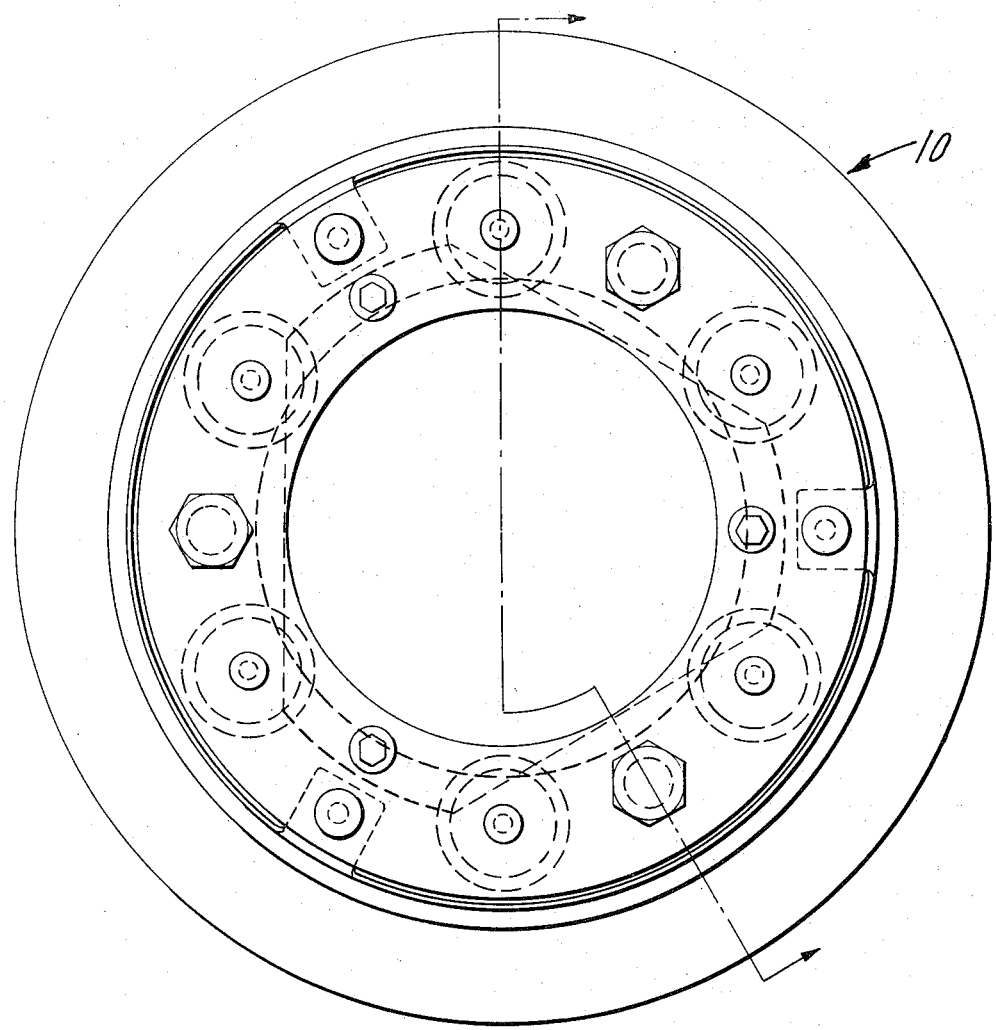
FIG. 3 is an end view of the valve illustrated in FIGS. 1 and 2.

FIGS. 1, 2, 3 and 4 illustrate a pneumatic pressure relief valve 10 comprising as its major relatively movable members a fluid-conducting housing 11, a piston 12 in guide relation with the housing, a shroud 15 comprising a spring seat support ring 16 and a cylindrical cover 17, bolts 18 functioning as means for spacing the ring 16 from the head 21 of the housing 11. As shown, the housing head 21 provides threaded holes 22 into which reduced-diameter threaded end portions 24 of the bolts are turned to engage shoulders 25 of the bolts with the upper surface of the head 21. Each bolt has a sleeve 27 pinned thereto and providing a lower flange 28 functioning as a stop for the piston 12 in its fully opened position as shown in FIG. 2. It may be observed that the bolts 18 are aligned with their lengths parallel to the longitudinal axis N—N of the valve. Side surface 31 of the housing head is cylindrically concentric with respect to axis N—N and defines a groove for receiving a seal ring 32 in slidable engaged relation with the inner cylindrical surface 23 of the piston 12. Hence the piston is confined by the bolts 18 and the ring 32 to movements lengthwise of the axis N—N. Normally, the housing 11 is rigidly mounted on other equipment and the piston is the movable member with respect to such equipment.

The head 35 of the piston 12 is formed as an internal flange extending radially inwardly from the piston's outer cylindrical wall 36. The head or flange 35 provides a support for a plurality of spring seats 37 in opposed facing relation with a corresponding plurality of spring seats 38 attached to the underside of support ring 16. Spring seats 37, 38 face along axes 39 parallel to main longitudinal axis N—N. A shroud 41 with a flared skirt portion surrounds the entire outer peripheral surface of the piston and fits tightly thereto by an inwardly crimped portion of the shroud at circumference 42 of the piston and along the periphery of the top flange portion 43 of the piston head.

Figure 4:
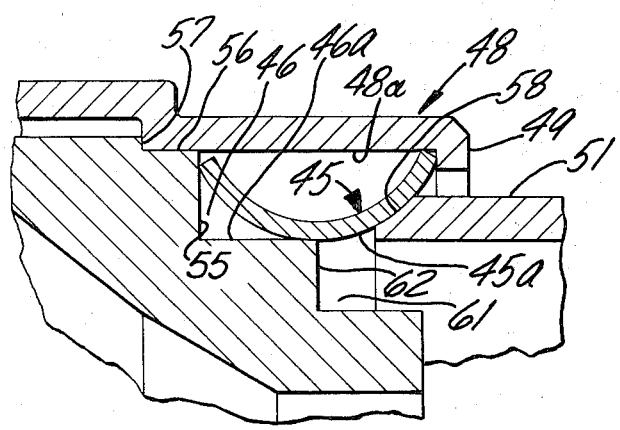
FIG. 4 is a fragmentary, enlarged view of elements from FIG. 1 shown therein cooperating to establish a sealed relationship at the closed condition of the valve.

Referring now to the valve seal structure as a main feature of the invention herein claimed, FIGS. 1, 2 and 4 illustrate that the housing 11 supports a sealing element in the form of a ring 45 disposed in concentric relation with the axis N—N. According to this embodiment, the housing has an exterior annular recess 46 which, in the axial direction, is only partially, preferably not more than half, as wide as the ring. The surface 46a of the recess 46 is complementary in circumference to that of radially inner convex face 45a of the ring 45. As shown, the ring is of concavoconvex cross section in a radial plane containing axis N—N. The ring is essentially a light gauge strip of sheet material providing a thin wall of concavo-convex or other bulging cross sectional contour. In the now described embodiment, the outer circular edges of the ring fit along the inner surface of a retaining ring 48 having one annular portion in threaded relationship with an outer surface of the housing 11 and another annular portion in outward radial relation with the bottom of the recess 46. The latter portion is of sufficient width in a direction parallel to the axis N—N to receive the entire width of the sealing ring 45. The inner exposed surface of the ring 48 provides and essentially defines a recess for receiving the seal ring 45. The inner surface 48a of the ring 48 provides a floor of the recess of width at least equal to that of the seal ring 45 as shown. Preferably the retaining ring 48 has a radially inturned flange 49 which acts to confine the seal ring 45 within the recess 46. The flange is merely wide enough in a radial direction to confine the ring 45 within the recess 46. In all events, the width of the flange 49 is limited in width so as to remain outside of the path of a circumferentially enlarged skirt 51 of the piston 12 into engagement with the ring 45 as the piston traverses its path lengthwise of the axis N—N. As shown in the enlarged view of the dynamic seal portion of the valve, i.e., FIG. 4, the skirt 51 may move in the direction of the double-headed arrow into and out of contact with a mating, appropriately biased portion of the convex or bulging surface 45a of the ring 45. To establish a precise dimension between side surface 55 of the recess 46 and the flange in which to confine the ring 45, the portion of the retainer ring 48 in threaded relation with the housing is constructed to a larger diameter than that of the ring confining portion, and the housing is constructed with a small outside annular recess at 56 to provide interlocking shoulders of the retainer ring and the housing at 57.

The valve 10 is shown in closed condition in FIG. 1. In its open condition as shown in FIG. 2 gas may escape from internally of the valve somewhat as indicated by the arrows. The valves of the other embodiments described below open and close in a similar manner.

As more clearly shown in FIG. 4, the piston skirt 51 has an annular bevel or conical surface 58 in close agreement with the inclination of that biased portion of the seal ring surface 45a engaged by the skirt. The housing 11 has an additional annular recess 61 of smaller radius than the recess 46 providing ample room for movement of the piston skirt into contact with the ring 45. The radially extending side surface 62 of the recess 61 provides an emergency stop for the skirt and provides protection against wedging of the skirt with the ring.

Seal ring 45, in its normal use, is intended for functioning under temperatures of the order encountered in the exhaust gases of internal combustion engines and can be made of stainless steel or other temperature resistant alloy. It is desirable that the material of the ring be tough and resilient even under high temperature since, during operation, it is desirable that the ring receive the skirt 51 in a resilient manner and to yield slightly to establish an effective seal. The beveled end of the piston skirt may be chrome-plated for wear resistance.

Figures 5, 6:
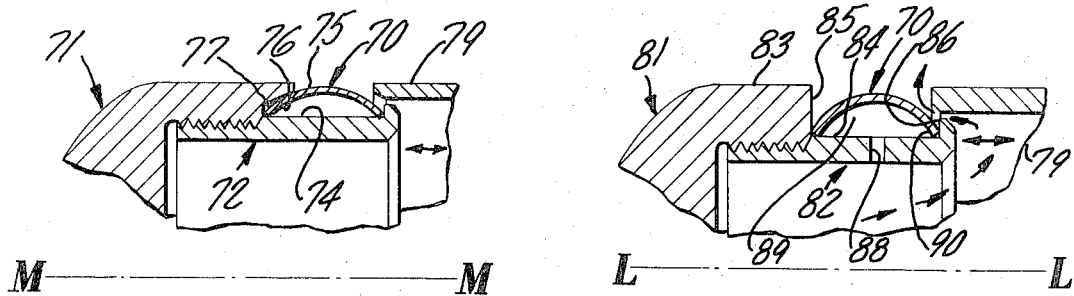
FIG. 5 is a fragmentary view illustrating a valve having a sealing ring which bulges radially outwardly along a transverse plane containing the axis of the valve, showing the sealing ring received in a recess partly formed by a retainer ring.
FIG. 6 illustrates a modified valve having a sealing ring similar to that of FIG. 4 received between two sides of a groove formed by a retainer ring in threaded relation with a flange of a valve housing.
Figure 7:
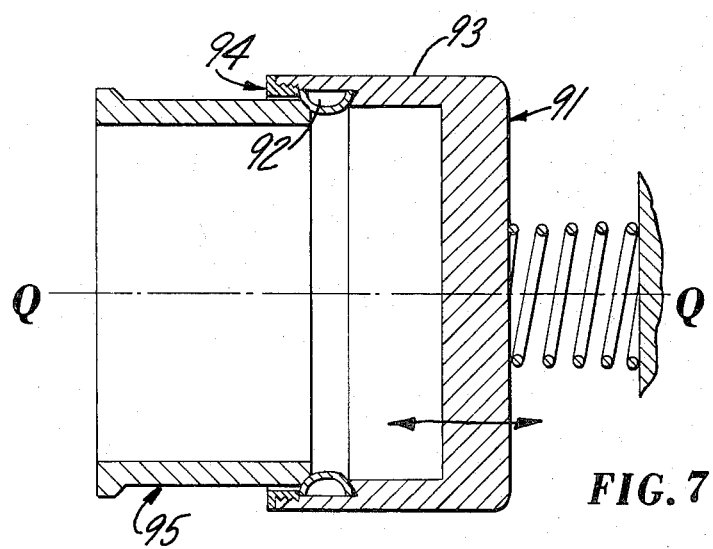
FIG. 7 illustrates a modified valve having a sealing ring which bulges radially inwardly along a transverse plane in cross section containing the axis of the valve in which the ring is retained in a recess partially defined by an internal retaining ring.
Figure 8:
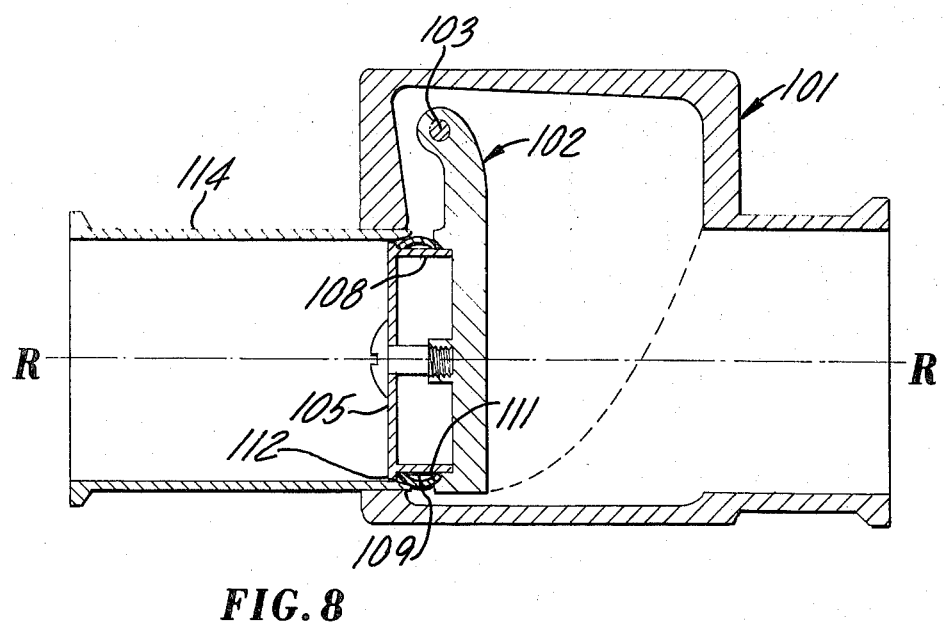
FIG. 8 illustrates a valve in longitudinal cross section along a longitudinal axis wherein a movable seal ring valve member is mounted pivotally within a valve housing.

FIGS. 5–8 illustrate further embodiments of the invention. FIGS. 5, 6 and 8 illustrate valve constructions wherein respective seal rings are of concavo-convex cross section that bulges radially outwardly relative to the longitudinal axes of respective valves. In FIG. 5, a seal ring 70 similar in construction except that curvature of cross section is reversed with respect to that of the seal ring 45 is supported by a modified housing 71 and a retainer ring 72. The retainer ring is disposed generally radially inwardly of the ring supporting wall of the housing 71 with a portion thereof in threaded relationship with the housing wall, leaving another portion extending beyond the housing wall having a suitable surface 74 on which to receive the ring 70. Preferably, the surface 74 is circumferentially complementary to the circular edges of the ring bearing thereon. As shown, the retainer ring 72 supports the seal ring with an outer convex surface 75 in line contact with a biased surface 76 of a tapered flange portion of the housing wall formed by an internal recess 77 of the wall. It should be noted that the edge of the ring 70 bearing on surface 74 has axial clearance with the axially adjacent end surface of the recess 77. Support of the seal ring in this manner allows resiliency of the ring when engaged by a piston skirt 79 moving into engagement with the ring in the direction of the double-headed arrow.

FIG. 6 illustrates a modified valve construction wherein a valve housing 81 is shown constructed without an internal recess, such as recess 77 shown in FIG. 5. In this embodiment, the retainer ring 82 of construction similar to ring 72 is secured in threaded relation with the axially extending wall 83 of the housing. The seal ring lacks any axial overlapping by the wall 83 tending to entrap the ring in a radial outward direction. The ring is supported solely by the outward circumferential surface 84 or flow of a recess formed by the retainer ring and an end surface 85 of the housing wall and a shoulder flange 86 of the retainer ring. As in the case of FIG. 5, the radial dimension of the retainer ring flange is limited to avoid interference with movement of the piston skirt 79 into engagement with the ring 70. An aperture 88 is provided to that portion of the retainer ring 82 enclosed by the body of the seal ring 70. This aperture permits the passage of gas from the interior of the housing 81 to the region 89 enclosed by rings 70 and 82 to effect an equalization of pressure between the interior of the valve and the region 89. Such equalization causes a dampening or cushioning effect in the engagement of the piston skirt 79 with the ring 70 in addition to reducing the seal stresses caused by loading. Other modes of communicating gas from the interior of the valve to underneath the ring 70, such as serrating the edge 90 of the ring 70, will achieve a similar effect.

FIG. 7 illustrates the seal ring 45 in a somewhat different environment than that of FIGS. 1–4 by being supported on the movable member of a valve, i.e., piston 91 movable in a direction parallel to the valve axis Q—Q. The seal ring 45 is shown received in a radially shallow recess 92 along the inner surface of a generally cylindrical wall 93 of the piston. The floor of the recess faces radially inwardly. The seal ring is given further support by a retainer ring 94 shown in threaded relation with an internal circular surface of a portion of the wall 93 adjacent its open end. The ring 94 provides a radially extending side of the recess 92. A portion of the piston extends axially partly over the ring 45 to provide radial entrapment. Structure for radial entrapment may be considered optional since for some purposes the recess 92 need only extend radially to provide axial entrapment.

FIG. 8 illustrates a valve housing 101 within which is mounted a swingable valve member 102 mounted within the housing 101 on a pivot pin 103. The member 102 further comprises an annular drum 105 secured to a base 106 by screw 107. The drum wall 108 of the drum 105 seats on the base 106 in a shallow circular recess therefor, leaving exposed its cylindrical outer surface or recess floor 109 having a circumference suitable for receiving ring 45. The ring 45 is trapped between an annular cup surface 111 and a flange 112 of the drum 105 of low height. The member 102 is swingable about its pivot on pin 103 to bring the ring into seating relation with the end surface of a tubular portion 114 of the housing and to establish continuous circularly seated relation therewith.

Looking to FIGS. 1–4 as exemplary in the practice of this invention, the valve 10 functions as a pressure relief valve in which fluid pressure is caused to build up in the housing 11 in the closed condition of the valve as shown in FIG. 1. When the pressure reaches some predetermined level, end areas of the piston 12 facing parallel to the axis N—N toward the bottom of the figure as shown are acted upon to cause the piston 12 to move out of sealed engagement with the seal ring 45 while compressively loading the springs 40 between their seats 37, 38 in a manner as shown in FIG. 2. This figure also illustrates the manner of passage of a fluid, normally hot gas, through, and escape from, the valve 10. Once the valve is opened, the velocity pressure as the fluid changes direction in passing outwardly tends to keep the valve open by action of the escaping fluid on the skirt 41 in the presence of static pressures that are lower than that which opened the valve. At a desired drop in the internal static pressure of the valve, determined primarily by the strength of the springs 40, the piston 12 moves again into engagement with seal ring 45.

What is claimed is:

1. A valve assembly comprising:
   a pair of relatively movable members, and guide and support means therefor for supporting the members for movements along a predetermined path into and out of engagement in effecting a substantially fluid-tight seal, one of the members having a fluid-conducting passageway terminating within said seal;
   a first of said members including a resilient seal element extending in a circuit about the center of said path along a general transverse plane aligned crosswise of said path, said first member defining a continuous recess extending in said circuit and having a floor facing transversely relative to said path for receiving said element, said floor being of a width to support the full width of said element, said element having continuous biased valve-seat surface facing in transverse inclined relation with said path and exposed aligned relation with the other of said members for engagement thereby, said element effecting sealed relation with a surface of said first member when said element is engaged by the second of said members;
   said second member having a circuital surface located and constructed in respect to said valve seat surface to effect continuous sealing engagement therewith at the completion of closing movements of the members along said path.

2. The valve assembly of claim 1 wherein:
   said circuital recess faces away from the center of said path and has a side surface facing lengthwise of said path toward the second member for holding said element in sealing relation with said second member at sealing position.

3. The valve assembly of claim 2 wherein:
   said element is received in said recess and comprises a thin wall of flexible sheet material bulging outwardly relative to the floor of the recess in a direction along said transverse plane to define said biased surface.

4. The valve assembly of claim 3 wherein:
   said wall is of concavo-convex cross section and at least one edge of said wall conforms circuitly to said recess floor.

5. The valve assembly of claim 4 wherein:
   said first member forms said recess as a groove having side surfaces extending transversely of said path, said wall having its edges in close-fitting relation with said side surfaces and said floor.

6. The valve assembly of claim 2 wherein:
   said first member comprises a circuital wall centered with respect to said path having said recess formed along its inward-facing surface; and
   said element bulges toward a central longitudinal axis of the member wall.

7. The valve assembly of claim 4 wherein:

said first member comprises a circuital wall centered with respect to said path having said recess along its outward-facing surface; and said element bulges outwardly away from a central longitudinal axis of said member wall.

8. The valve assembly of claim 2 wherein:

said first member in providing said recess with an inwardly facing floor has a circuital wall in centered relation with said path and an external sleeve, said wall having an external groove formed along its outer surface, said sleeve secured to an outer surface portion of said wall adjacent said groove on the side thereof away from said second member, said sleeve axially overlapping the groove and extending beyond said groove to fully form said inwardly-facing recess whereby said biased surface of the element is at least partially exposed for contact with the second member.

9. The valve assembly of claim 2 wherein:

said first member comprises a circuital wall in centered relation with said path, and an inner sleeve attached to an inner surface portion of the member wall adjacent its end, said sleeve extending toward said second member to provide an external surface defining said element-receiving recess, said member end providing said side surface of the recess.

10. The valve assembly of claim 1 wherein:

said first member comprises a detachable cap-like retainer normally secured to a body portion of the first member in centered relation with said path, said cap having a drum surface for supporting said element and a flange extending radially outwardly from the drum surface to a radius substantially less than the outer radius of the element, said drum surface being located between the flange and said body.

11. The valve assembly of claim 1 wherein:

said circuital surface of the second member is beveled to an inclination substantially that of said biased surface.

12. The valve assembly of claim 1 wherein:

said first member has a circuital wall defining a recess having a floor facing outwardly from center of said path, and a side surface facing lengthwise of said path toward the second member;

a sleeve member secured to said wall adjacent to the recess on the side thereof further from the second member with a portion of the sleeve member overlapping at least a portion of the recess; and flange means on the first member spaced from said side surface for a distance of at least the width of said element and partially overlapping the radial thickness of the element to entrap the element in said recess.

13. The valve assembly of claim 1 wherein:

said members having engageable portions which define stop means apart from said element which limit closing movements of the members a short predetermined distance along said path beyond an initial engagement through said element.

14. The valve assembly of claim 1 wherein:

said supporting means for the members comprises means for pivotably supporting one member for movement along an arcuate path.

* * * * *